United States Patent [19]

Ling et al.

[11] Patent Number: 5,245,611
[45] Date of Patent: Sep. 14, 1993

[54] METHOD AND APPARATUS FOR PROVIDING CARRIER FREQUENCY OFFSET COMPENSATION IN A TDMA COMMUNICATION SYSTEM

[75] Inventors: Fuyun Ling, Jamaica Plain, Mass.; Gerald P. Labedz, Chicago, Ill.

[73] Assignee: Motorola, Inc., Schaumburg, Ill.

[21] Appl. No.: 709,004

[22] Filed: May 31, 1991

[51] Int. Cl.$^5$ .............................................. H04J 3/06
[52] U.S. Cl. ................................. 370/100.1; 375/15; 375/114
[58] Field of Search ............... 370/100.1, 95.1, 95.3; 375/83, 85, 90, 96, 114, 106, 116; 371/46, 47.1

[56] References Cited

U.S. PATENT DOCUMENTS

| | | | |
|---|---|---|---|
| 4,324,001 | 4/1982 | Rhodes | 375/90 |
| 4,829,543 | 5/1989 | Borth et al. | 375/83 |
| 4,847,869 | 7/1989 | Labedz et al. | 375/85 |
| 4,873,683 | 10/1989 | Borth et al. | 375/101 |
| 5,007,068 | 4/1991 | Simon et al. | 375/85 |
| 5,097,220 | 3/1992 | Shimakata et al. | 375/85 |

OTHER PUBLICATIONS

"An MLSE Receiver with Carrier Frequency Estimater for TDMA Digital Mobile Radio" by Kazuhiro Okanoue, Yosihnori Nagata and Yukitsuna Furuya, Proceedings of the fourth Nordic Conference on Digital Mobile Radio Communication, Oslow Norway, Jun. 26-28, 1990, pp. 1-9.

"An Adaptive MLSE Receiver for TDMA Digital Mode Radio", by Renato D'Avela, Luigi Moreno and Marcello Sant'Agostino, IEEE Journal on Selected Area in Communications, vol. 7, No. 1, Jan. 1989, pp. 122-129.

Gottfried Ungerboeck, "Adaptive Maximum-Likelihood Receiver for Carrier-Modulated Data-Transmission Systems," IEEE Transactions on Communications vol. COM-22 (1974): 624-636.

Primary Examiner—Douglas W. Olms
Assistant Examiner—Shick Hom
Attorney, Agent, or Firm—Val Jean F. Hillman

[57] ABSTRACT

The present invention relates to a method and apparatus for providing carrier frequency offset compensation in a time division multiple access (TDMA) communication system. In this effort a TDMA receiver is adapted to receive, via a transmission channel, a transmitted signal burst which includes a synchronization signal pattern, a message signal portion and at least one known portion, in a TDMA time slot. Initially, a phase error at that portion of the received signal which corresponds to the known portion of the transmitted signal is determined. Thereafter, various received signal parameters are adjusted in order to eliminate the phase error and thereby compensate for any carrier frequency offsets.

24 Claims, 4 Drawing Sheets

METHOD AND APPARATUS FOR PROVIDING CARRIER FREQUENCY OFFSET COMPENSATION IN A TDMA COMMUNICATION SYSTEM

FIELD OF THE INVENTION

The present invention relates generally to radio receivers, and more particularly to digital radio receivers. Specifically, however, the present invention relates to a method and apparatus for providing carrier frequency offset compensation in an adaptive time division multiple access (TDMA) radio receiver system.

BACKGROUND OF THE INVENTION

In a high data rate TDMA mobile radio communication system, the typical transmission channel experiences multipath interference, in addition to Rayleigh fading. Thus, the radio receiver for a mobile or portable TDMA system must accommodate the reception of multiple replicas of a transmitted signal, each with random magnitude, phase and time delay with respect to the transmitted signal. Without corrective measures, the intersymbol interference (ISI) caused by both multipath and Rayleigh fading will severely degrade the receiver's performance.

It will be appreciated by those skilled in the art that the process of correcting for channel-induced distortion is called equalization. Several types of equalizers may be employed in this effort, such as, for example, linear equalizers, decision feedback equalizers (DFE), and maximum-likelihood sequence estimation (MLSE) equalizers. The remainder of this discussion will concentrate on receivers employing MLSE type equalization.

In 1972 it was theorized by Dr. G. D. Forney Jr., that a maximum-likelihood sequence estimation (MLSE) function was applicable to data transmission system equalization, see G.D. Forney, Jr., "Maximum-Likelihood Sequence Estimation Of Digital Sequences In The Presence Of Intersymbol Interference", IEEE Transactions on Information Theory, Vol. 18, No. 3, May 1972, pp. 363–377. MLSE is a sequence estimation technique which involves maximizing or minimizing an objective function.

Initial attempts at evaluating an objective function utilizing MLSE proved too complex to be of practical use. Therefore, Dr. Forney reformulated the problem and employed the Viterbi algorithm to assist in the computation of the function. It will be appreciated that the Viterbi algorithm significantly reduces the number of computations required to implement MLSE. For a more detailed review of the Viterbi algorithm and MLSE equalization, reference may be made to G. D. Forney Jr., "The Viterbi Algorithm", Proceedings of IEEE Vol. 61, No. 3, March 1973, pp. 268–278.

A receiver structure improving upon the Forney MLSE equalizer was described by Dr. G. Ungerboeck, "Adaptive Maximum-Likelihood Receiver For Carrier-Modulated Data-Transmission Systems", IEEE Transactions on Communications Vol. COM-22, pp. 624–636, May 1974 More recently, another MLSE receiver was disclosed by R. D'avella et al., "An Adaptive MLSE Receiver for TDMA Digital Mobile Radio", IEEE Journal On Selected Areas In Communications. Vol. 7, No. 1, January 1989. In the D'avella system, it is assumed that a carrier frequency offset, caused by either a Doppler induced frequency shift as part of the radio channel characteristic, hereinafter referred to as the channel impulse response (CIR), or a frequency difference between a transmitter and receiver's local oscillator, will cause distortions within each received TDMA signal on a burst-by-burst basis. Consequently, D'avella's system is designed to track and remove such distortion. Utilizing a coherent, decision-directed, detection technique, D'avella's MLSE receiver derives a new estimate of the CIR for each received burst. Next, the matched filter tap gains are computed as the complex conjugate of the estimated CIR samples. Thereafter, a gradient algorithm is used to minimize the mean-square error by adjusting the matched filter's tap gains as disclosed in the previously cited article by G. Ungerboeck. Unfortunately, sequence estimation delays limit the allowable carrier frequency offset ranges that can be compensated for by D'avella's system.

Yet another MLSE type receiver was disclosed in June of 1990 by Kazuhiro Okanoue et al., "An MLSE Receiver with Carrier Frequency Estimator for TDMA Digital Mobile Radio", Proceedings of the Fourth Nordic Conference On Digital Mobile Radio Communication, Oslow Norway, Jun. 26–28, 1990. This MLSE receiver adopts demodulation principles whereby carrier frequency offset estimations are performed as a function of a matched filter's output, before any data signal estimations are made. Accordingly, Kazuhiro Okanoue et al. suggests a non-decision-directed carrier frequency estimation technique. It will be appreciated by those skilled in the art that non-decision-directed detection techniques typically sacrifice performance in favor of speed. It would therefore be extremely advantageous to provide an alternative MLSE receiver arrangement capable of providing carrier frequency offset compensation in a TDMA communication system, while overcoming the shortcomings of the prior art.

SUMMARY OF THE INVENTION

Briefly described the present invention is a method and apparatus for providing carrier frequency offset compensation in a TDMA communication system. In this effort, a TDMA receiver is adapted to receive, via a transmission channel, a transmitted signal which includes a synchronization signal portion, at least one known portion and a message signal portion, in a TDMA time slot. Initially, a phase error at that portion of the received signal which corresponds to the known portion of the transmitted signal is determined. Thereafter, various received signal parameters are adjusted in order to eliminate the phase error and thereby compensate for any carrier frequency offsets.

It is a primary advantage of the present invention that offset compensation is provided for prior to message signal sequence estimation.

It is another advantage of the present invention that several phase error estimates are averaged together in order to improve the accuracy as well as the stability of systems employing the present invention.

DETAILED DESCRIPTION OF THE PREFERRED EMBODIMENT

Figures 1, 2:
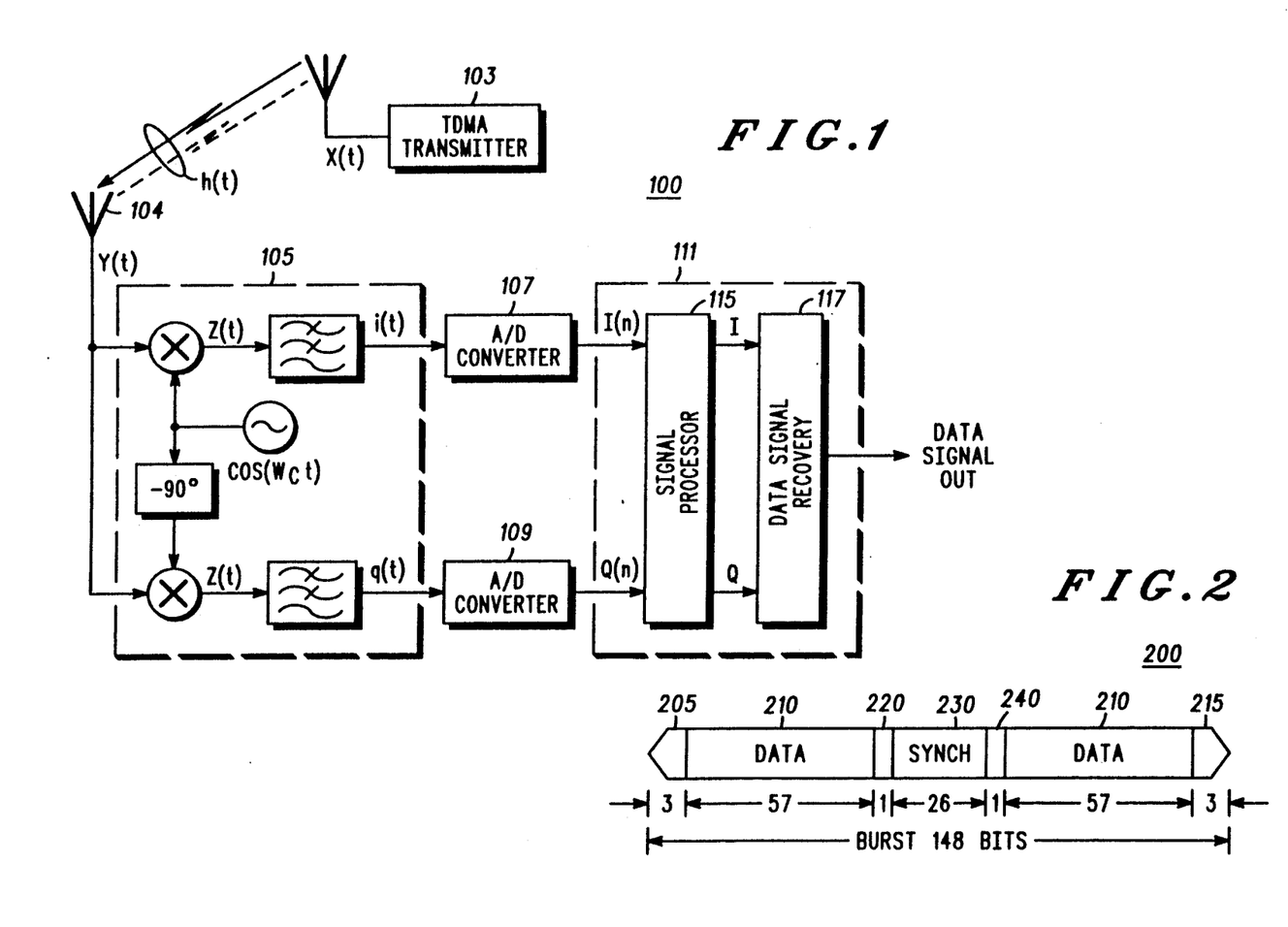
FIG. 1 is a block diagram of a data transmission system employing quadrature-type digital transmission and reception.
FIG. 2 depicts the data structure of a burst transmission according to the present invention.

A radio frequency system 100 conveying a data signal from a transmitter 103 to a receiver (105-117) is shown in FIG. 1. In the preferred embodiment, Gaussian Minimum Shift Keying (GMSK) is employed to increase the throughput of the channel, although other quadrature-type signaling may be employed, such as, for example, Minimum Shift Keying (MSK), Phase Shift Keying (PSK), Quadrature Phase Shift Keying (QPSK), Offset Quadrature Phase Shift Keying (OQPSK) and Multiple Phase Shift Keying (MPSK). Further, the well known time division multiple access (TDMA) technique of sharing limited channel resources among a large number of users is also employed. Consequently, each user is assigned a brief period of time (a time slot) during which a message may be transmitted from or received by other users.

In operation, the receiver (105-117) will receive burst communication signals x(t) in a time slot from a TDMA transmitter 103, received on antenna 104 and applied to quadrature demodulator 105 as a signal y(t). The quadrature demodulator 105 produces two downconverted signals i(t) and q(t) which are the real and imaginary parts, respectively, of a complex demodulated signal z(t). The amplitude of z(t) is written as:

$$|z(t)| = \sqrt{i^2(t) + q^2(t)} \quad (1)$$

and the phase of z(t) is written as:

$$\tan^{-1}\frac{q(t)}{i(t)} \quad (2)$$

The signals i(t) and q(t) are applied to conventional analog-to-digital converters 107 and 109 which digitize the signals in order to present digitized samples thereof to the equalizer circuit 111 consisting of a signal processor 115 and data signal recovery circuit 117. The digitized samples of i(t) and q(t) are represented as I(n) and Q(n), respectively, where n is an index to the digitized samples.

It will be appreciated by those skilled in the art that the radio channel impulse response (CIR), depicted as h(t) in FIG. 1, is subject to Doppler frequency changes resulting from relative motion between the transmitter 103 and the receiver (105-117). These Doppler effects will cause a transmitted signal's carrier frequency to change. This frequency change, also known as the carrier frequency offset, introduces time varying phase errors into the demodulated signal z(t). Additional time varying phase errors may be introduced when the transmitter's carrier-generating oscillator is operating at a different frequency from the receiver's carrier-generating oscillator. The total error may be expressed as a time varying phase error, or frequency error, between the transmitted signal x(t) and the demodulated signal z(t). The present invention is directed at determining this phase error and providing compensation therefore.

In most radio communication systems, for example, the digital radiotelephone communication system for use in Europe defined in GSM documents GSM 05.01 "Physical Layer on the Radio Path: General Description" and GSM 05.02 "Multiplexing and Multiple Access On the Radio Path", the data structure within a transmitted burst is well defined. FIG. 2 depicts the data structure of a burst transmission (200). Each transmission consists of 148 bits which are transmitted at a rate of 270.833 kilobits/second. 114 of these bits (210) are available for actual data transmission, the rest are used to assist reception and detection of the burst. A training sequence in the middle of the burst, referred to as the synchronization signal pattern or Synch Word (230), is used by the receiver (105-117) to estimate the radio channel impulse response (CIR) and to synchronize the receiver's operation. Three end or tail bits (205 and 215) at either end of the burst delimit the begin and/or end of the burst and will be used to assist in the equalization of the data message portion of the signal (200). Finally, two stealing flags (240) immediately before and after the Synch Word (230) indicate that a burst which originally had been assigned to a traffic channel was "stolen" for signalling purposes.

According to the preferred embodiment, the present invention utilizes the tail bit portions (205 and 215) of a transmitted burst (200), as a reference against which carrier frequency offset compensations can be made. Each tail bit comprises known information which remains constant from burst-to-burst. It is therefore possible to determine an amount of carrier frequency offset induced phase error, at those portions of a received burst which correspond to the known tail bits. Thereafter, on a burst-by-burst basis, adjustments are made to the received signal in order to resolve the phase error and thereby compensate for the carrier frequency offset.

Figure 3:
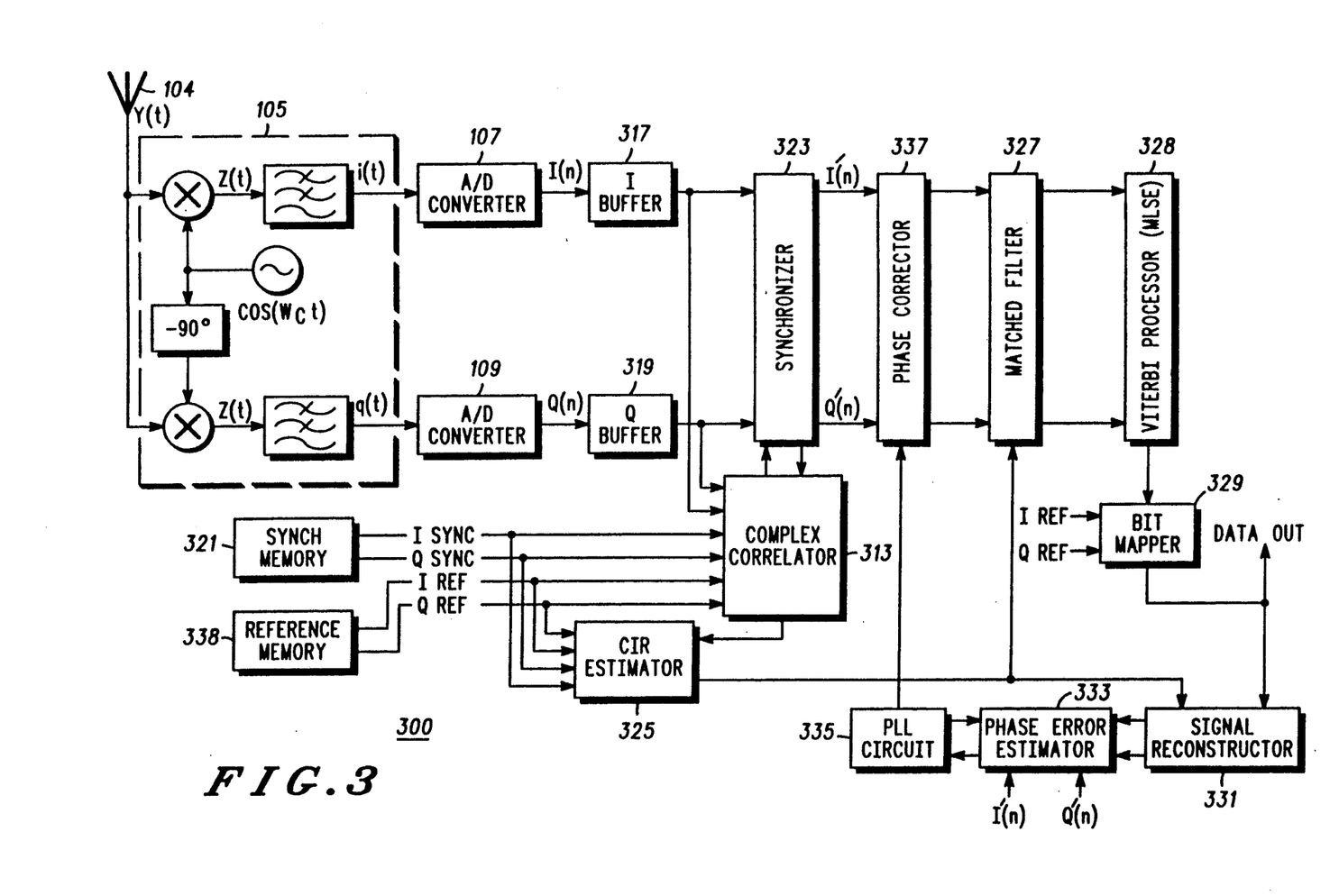
FIG. 3 is a block diagram of a TDMA receiver which receives the burst transmission of FIG. 2 and employs the present invention to compensate for carrier frequency offsets.

FIG. 3 is a block diagram of a receiver which may be employed to recover quadrature-type modulation schemes, such as, for example, GMSK modulated data. This receiver also employs the present invention to compensate for carrier frequency offsets. Worth noting, the present invention has application in digital radio communication systems which employ TDMA message transmission, where the rate of change of the CIR is slower than the time slot duration.

In accordance with a preferred embodiment, the digitized samples I(n) and Q(n) from A/D converters 107 and 109 are stored in I and Q buffers 317 and 319, respectively. Thereafter, the digitized samples are applied to a complex correlation circuit 313. In this circuit a complex correlation, as is well known in the art, is performed between the samples I(n) and Q(n) and a complex replica of the synchronization signal pattern stored in memory device 321 (SYNCH MEMORY).

The complex correlation between two complex numbers is defined by:

$$\phi(\tau) = \int_{-\infty}^{+\infty} \{i(t) + jq(t)\} \{r_i(t - \tau) - jr_j(t - \tau)\}dt \quad (3)$$

This equation may be written in its sampled form, using the sampled inputs I(n) and Q(n) as:

$$\phi(m) = \sum_{-\infty}^{+\infty} \{I(n) r_r(n - m) + Q(n) r_i(n - m)\} + \quad (4)$$

$$j\{Q(n) r_r(n - m) - I(n) r_i(n - m)\}$$

$$\phi(m) = R_r(m) + jR_i(m) \quad (5)$$

where $r_r(n)$ and $r_i(n)$ are sampled real and imaginary parts of the stored complex number, m is the relative sample shift between the input signal and the stored complex number, and n is the sample index. It will be appreciated that the computation of this correlation yields a complex result carrying both amplitude and phase information and represents a "sounding" of the channel. This correlation is to be computed upon the reception of each burst signal and will be used to provide both synchronization and an estimate of the channel impulse response.

In order to achieve synchronization the magnitude of the correlation is computed by complex correlator 313 according to:

$$|\phi(m)| = \sqrt{R_r^2(m) + R_i^2(m)} \quad (6)$$

and is then passed to the synchronizer circuit 323 which locates the synchronization signal pattern within each received burst. While a single sample per data symbol is sufficient to provide detection, each Synch word symbol is made up of several I(n) and Q(n) samples. It is therefore desirable to pick the best sample per Synch word symbol. According to the preferred embodiment, this is accomplished by searching $|\phi(m)|$ for the peak magnitude. Since only one non zero value per symbol is stored in memory, the I(n) and Q(n) samples which correspond with the one non-zero value make up a reference for the set of samples for further processing. Samples to be used are chosen at one symbol intervals from the synchronized sample reference and form the sequences I'(n) and Q'(n), which are a subset of the sequences I(n) and Q(n). Synchronization schemes, as described herein, and for use by quadrature receivers during data recovery are well known in the art and require no additional discussion at this time. If further details are desired, the interested reader may nonetheless refer to U.S. Pat. No. 4,873,683, filed Dec. 4, 1987, and U.S. Pat. No. 4,847,869, filed Dec. 4, 1987 both assigned to the assignee of the present application and incorporated herein by reference.

Upon location of the synchronization signal pattern, an estimate of the communications channel's impulse response is made by CIR estimator 325. Communications channel impulse response estimations, as mentioned herein, are performed in accordance with well known channel sounding procedures. For additional information on such operations, the interested reader may once again refer to U.S. Pat. No. 4,873,683, filed Dec. 1, 1987 and assigned to the assignee of the present application. In the embodiment shown in FIG. 3, a maximum likelihood sequence estimation (MLSE) equalizer is employed for data signal recovery. The proposed MLSE equalizer consists of a matched filter 327, a Viterbi Processor 328, and a bit mapper 329. In operation, I and Q channel data signals are routed from buffers 317 and 319, respectively, to the matched filter 327 via synchronizer circuit 323 and phase corrector 337.

The matched filter 327 is coupled to a Viterbi processor 328 as disclosed in the aforementioned Ungerboeck reference. Before the output of the matched filter 327 can be further processed, it must be converted from complex to real numbers, by a complex to real conversion process. In the preferred embodiment GMSK modulation is used. The input stream of data symbols is first differentially encoded as described in the previously mentioned GSM recommendation 05.02. A translation to real is then readily accomplished by a translation process (not shown) which alternately takes real and imaginary samples from the matched filter output, one per symbol, as is well known in the art. Thereafter, as is conventional, the Viterbi processor 328, traverses a trellis from which likely sequences of data can be estimated from the input signals supplied by the matched filter 327. Thereafter, bit mapper 329 converts the Viterbi processor's output (comprised of logic ones and zeros) into a hard decision signal comprised of arithmetic positive and negative values $(+1, -1)$ which represent an estimate of the message signal portion of the received input signal. According to the preferred embodiment, the MLSE equalizer is implemented via software algorithms embodied in a digital signal processor (DSP), such as a 56001 or 56116 DSP available from Motorola, Inc. Of course, the proposed MLSE equalizer may also be implemented in hardware. MLSE equalization like that performed by the Viterbi processor 328 and matched filter 327 is well known in the art and therefore requires no additional discussion. The interested reader may nonetheless refer to G. D. Forney Jr., "The Viterbi Algorithm", Proceedings of IEEE Vol. 61, No. 3, March 1973 pp. 268-278 and Dr. G. Ungerboeck, "Adaptive Maximum-Likelihood Receiver for Carrier-Modulated Data-Transmission Systems", IEEE Transactions On Communications, Vol. COM-22, pp. 624-636, May 1974, which articles are hereby incorporated by reference.

As previously discussed, when the transmitted signal is subjected to influences like Doppler frequency shifts and/or differing transmitter and receiver local oscillator frequencies, the resultant carrier frequency offset will cause errors to occur in the MLSE's sequence estimation. Accordingly, the present invention is directed at determining the carrier frequency offset and compensating for the offset prior to the generation of a hard decision signal. In this way, it is possible to lower the error rate observed at the MLSE output.

In accordance with a first embodiment, the present invention utilizes known tail bit information in conjunction with the estimated CIR to construct a set of samples having no frequency error. These samples are then compared to actual received samples corresponding to the tail bit portions of the received burst in order to determine a phase angle difference (phase error). Since the tail bits comprise known information which does not change from burst to burst, such a comparison is possible. Thereafter, the phase angle difference between the constructed samples and the received samples is used to adjust the phase of the message signal portion of the received signal, prior to MLSE sequence estimation.

Referring to FIG. 3, bit mapper 329 receives input information from memory storage device 338 (REF MEMORY). By design, memory storage device 333 contains information (I REF WORD and Q REF WORD) corresponding to the tail bit portions of the transmitted signal. This information is then mapped into an arithmetic equivalent, and passed on to a signal reconstruction circuit 331. The signal reconstruction circuit 331 is designed to generate a replica of the received tail bits, minus any phase error, by convolving the bit mapper 329 outputs with the estimated channel impulse response determined by the CIR estimator 325. An expression for the replica signal is obtained from the equation:

$$r(n) = \sum_{i=0}^{L-1} c(i) \, d(n-i) \quad (7)$$

where $r(n)$ represents the replica signal, $c(i)$ represents sampled CIR estimates, $d(n)$ represents the sequence of hard decision samples, and L is the span in received symbol times of the estimated CIR.

Since CIR is a complex number, the replica signal is also complex and has a phase. As previously stated, the replica signal is compared, by phase error estimator 333, with the received signal samples corresponding to the tail bits, in order to determine a phase angle difference (phase error).

In order to simplify phase error computations, it is often desirable to rotate the replica signal samples by an angle determined as a function of the amount of carrier frequency offset estimated from previous burst signals. PLL circuit 335 provides the phase error estimator 333 with this angle of rotation, prior to phase error estimation. Typically, the magnitude of this modified phase error will be smaller than that determined without pre-rotation. As will be discussed below, phase error computations are greatly simplified when the magnitude of the phase error is small.

Another method for determining the phase error requires performing the complex correlation of equation (3) between the contents of memory storage device 338 and the input signal samples $I(n)$ and $Q(n)$ to provide a second set of complex CIR estimates. This second estimation of CIR relates to the phase error experienced by those data bits towards the outer edges of a received burst. Next, the first set of CIR estimates (generated during synchronization and stored in a memory device not shown) is compared to the second CIR estimate to determine a resultant phase angle difference (phase error).

One method of calculating the phase angle difference $\phi$ between two complex numbers is to actually calculate the sine of the phase angle difference, $SIN \, \phi$, and and then solve for $\phi$. An expression for this calculation is given by the equation:

$$SIN\phi = \frac{(i_1 r_2 - i_2 r_1)}{\sqrt{r_1^2 + i_1^2} \sqrt{r_2^2 + i_2^2}} \quad (8)$$

where $\phi$ is the phase angle difference, $i_1$ and $i_2$ are the imaginary part of the two complex numbers and $r_1$ and $r_2$ are the real parts of the two complex numbers.

An alternative method for calculating $\phi$ assumes that:

$$SIN\phi = \phi \quad (9)$$

when $\phi$ is relatively short duration of a received burst, the present invention may utilize this approximation in order to once again determine the phase angle difference between two complex numbers.

Since equation (6) operates to minimize any phase error at the center of the burst, it will be appreciated that $\phi$ is the approximate phase error at either end of a received burst. Due to the burst nature of TDMA signalling, input signal samples are demodulated from the middle of the SYNCH word (230), out. Since the tail bit samples, residing at the outer edges of a burst, are used to determine $\phi$, $\phi$ represents the phase error at either end of a burst. Consequently, the phase error from one end of the burst to the other may be approximated as $2\phi$.

At this point there are a number of ways to perform frequency offset compensation. According to the preferred embodiment, a PLL circuit 335 drives a phase correcting circuit 337, which adjusts the phase angle of the $I(n)$ and $Q(n)$ input signal samples prior to being filtered by the matched filter 327. This phase correction represents an attempt to compensate for the undesired time-varying phase errors introduced by either Doppler frequency shifts and/or differing local oscillator frequencies. Once again, due to the burst nature of TDMA signalling, the phase correcting circuit 337 demodulates the samples from the middle of the Synch word (230). Accordingly, the demodulation angle for each sample increases proportionally to the samples time based distance from the Synch word (230) center. In order to provide offset compensation, the samples are phase rotated, each by a differing amount, according to the distance from the synch word center and the estimated amount of phase error, $\phi$, from equations (8) or (9).

The amount of phase rotation required to provide offset compensation is governed by the equation:

$$a(n) = \phi \left[ \frac{2n}{(M-1)} \right] \quad (10)$$

where $a(n)$ is the phase correction to the nth pair of samples, $\phi$ is the phase angle difference estimated above and M is the number of bits per burst. By phase correcting the input signal samples according to equation (10), the present invention operates to improve the error rate observed at the MLSE output by eliminating the time-varying phase error due to carrier frequency offset, prior to MLSE sequence estimation.

Figure 4:
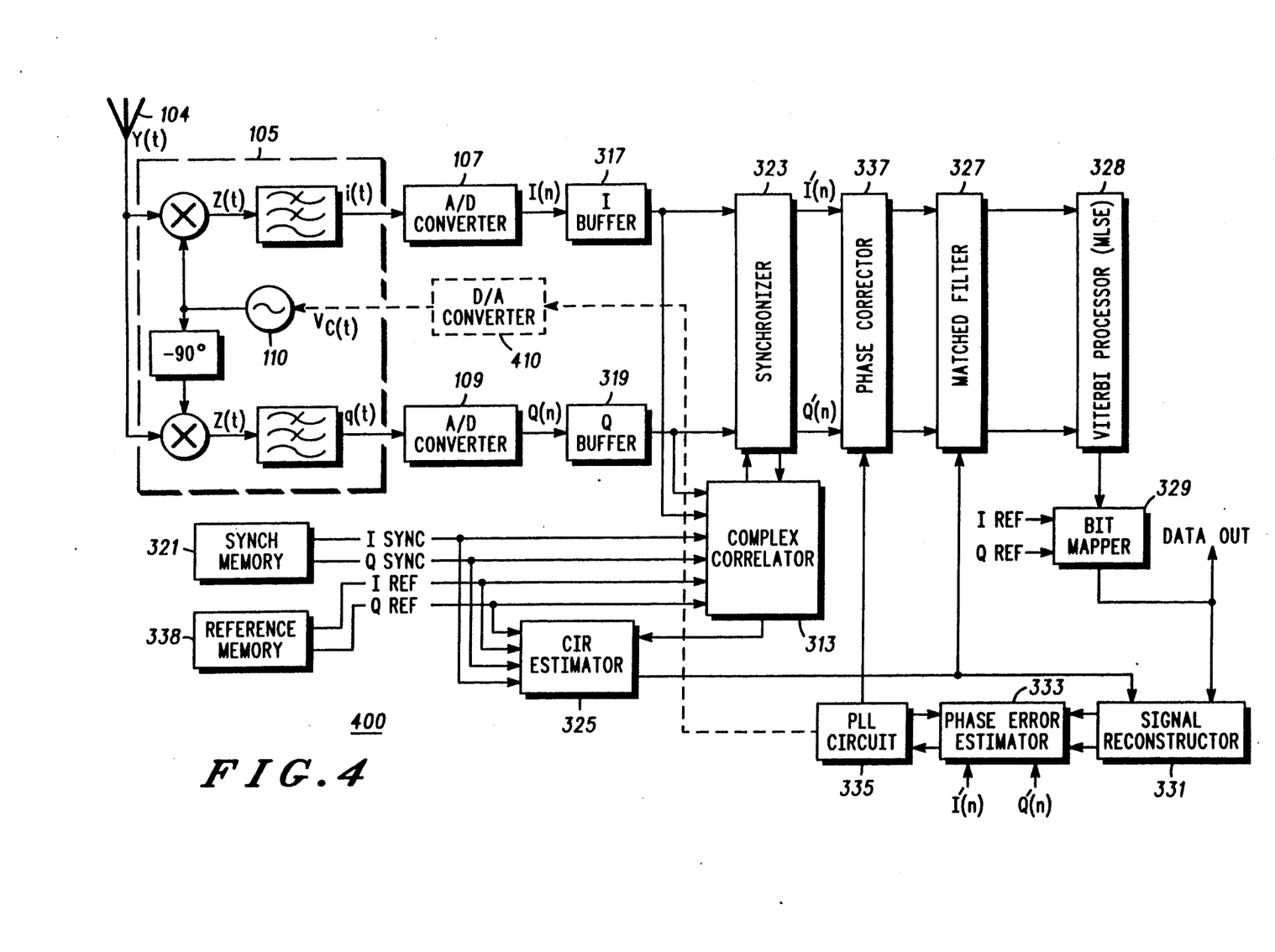
FIG. 4 is a block diagram of the TDMA receiver of FIG. 3 which employs an alternate carrier frequency offset compensation embodiment according to the present invention.

According to yet another embodiment, shown on FIG. 4 in phantom lines, frequency offset compensation is provided when the PLL circuit 335 output is converted to an analog voltage $V_c(t)$ by digital-to-analog (D/A) converter 410. The analog voltage, $V_c(t)$, drives the voltage controlled oscillator (VCO) 110 of quadrature demodulator 105 in order to eliminate virtually all the frequency offset between the transmitted signal $x(t)$ and the frequency of VCO 110. By adjusting the frequency of VCO 110, the embodiment of FIG. 4 operates to improve the the error rate observed at the MLSE output by eliminating carrier frequency offsets, prior to MLSE sequence estimation.

The embodiment depicted in FIG. 4 has application in those environments characterized by slow changes in phase error on a burst-by-burst basis. Otherwise, excessive amounts of processing power may be required to enable the system to respond on a real time basis. In all other respects, the receiver 400 of FIG. 4 operates in accordance with the description of receiver 300 of FIG. 3.

In order to improve the accuracy as well as the stability of the above described frequency offset compensation techniques, it is extremely advantageous to average phase error estimates from previous bursts with current phase error estimates. According to the embodiments depicted in FIGS. 3 and 4, PLL circuit 335 is employed in order to provide this averaging. According to the preferred embodiment, PLL circuit 335 has a time constant equal to 6 burst intervals.

Figure 5:
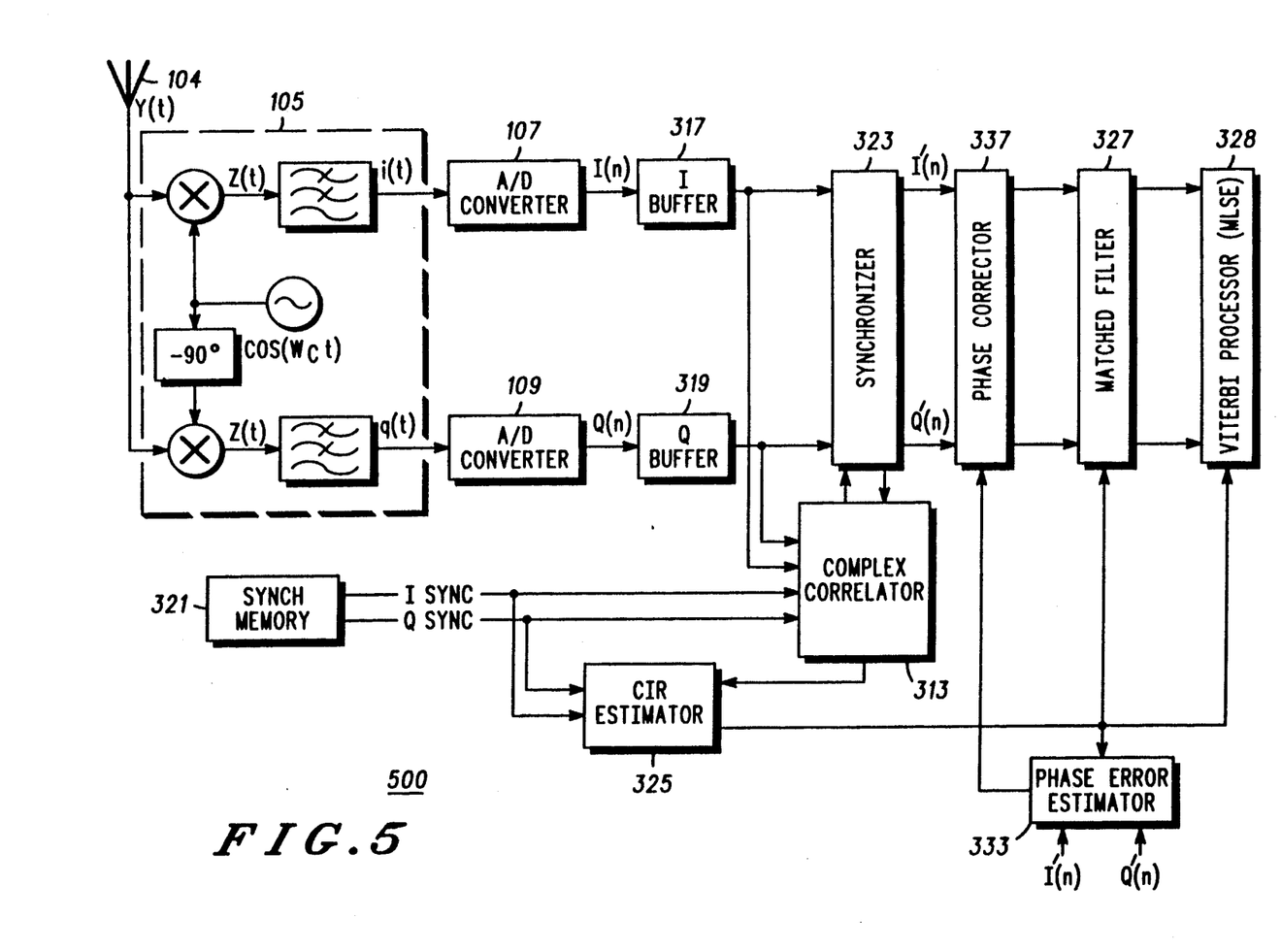
FIG. 5 is a block diagram of a TDMA receiver which employs yet another carrier frequency offset compensation embodiment according to the present invention.

Referring to FIG. 5, a block diagram of a TDMA receiver 500 which employs yet another carrier frequency offset compensation scheme is depicted. Pursuant to this embodiment, receiver 500 operates in accordance with the description of receiver 300 of FIG. 3 except that the PLL circuit 335, signal reconstructor 331 and bit mapper 329 have been removed. In their place, the CIR estimator 325 output is routed to the phase error estimator 333 and the Viterbi processor 328.

Assuming that only a single CIR sample is utilized during replica signal generation, equation (7) may be rewritten as:

$$r(n) = c(j)d(n-j) \tag{11}$$

Thereafter, a received tail bit input signal sample $(I(n)+jQ(n))$ having a phase error, $\phi$, can be written as the original transmitted symbol, rotated by $\phi$, and processed through the CIR term $c(j)$. An expression for such a signal is described as:

$$I(n)+jQ(n) = a_n e^{j\phi} c(j) \tag{12}$$

where $a_n$ is the transmitted signal, $\phi$ is the actual phase error and $c(j)$ is the CIR term.

At this point it will be appreciated by those skilled in the art that phase error computations become quite simple. In accordance, the phase error estimator 333 of the present embodiment receives the tail bit input signal samples, $I(n)+jQ(n)$, of equation (12), determines the most significant CIR component $c(j)$, by isolating the maximum magnitude matched filter tap gain generated during synchronization, multiplies the tail bit input signal samples by the complex conjugate of the known portion of the transmitted signal, $1/a_n$, and removes the complex tap, $c(j)$, by division to calculate the phase error $\phi$. This procedure is described by the following equation:

$$e^{j\phi} = \frac{I(n) + jQ(n)}{a_n \cdot c(j)} \tag{13}$$

Subsequent estimates of $\phi$ generated by equation (12) are averaged over several bursts to form a final estimate $\Phi$, which is used to phase rotate the input signal samples of an incoming burst according to equation (10). The fact that phase error estimator 333 knows the end symbols to be used, eliminates the need for the signal reconstruction circuit 331 of FIGS. 4 and 5. Due in part to this streamlining, the reduced computational load of the present embodiment greatly reduces the demands upon system processing resources.

It is worthwhile noting that the disclosed carrier frequency offset compensation techniques will avoid the prior art problems associated with delayed sequence estimation, by providing compensation prior to the generation of a hard decision signal.

Of course, additional modification to the depicted embodiments can be made without departing from the spirit of the present invention. For example, while the disclosed method and apparatus for carrier frequency offset compensation is described within the context of MLSE type equalization, it will be appreciated by those skilled in the art, that all equalization schemes will benefit from the advantages presented by the present invention.

What is claimed is:

1. A method for providing carrier frequency offset compensation in a time division multiple access (TDMA) communication system comprising the steps of:
   receiving a transmitted signal, which includes a synchronization signal pattern, at least one known portion and a message signal portion, in a TDMA time slot, via a transmission channel;
   determining a first phase error in response to receipt of the synchronization signal pattern;
   determining a second phase error in response to receipt of the at least one known portion of the transmitted signal;
   comparing the first phase error with the second phase error to determine a resultant phase error; and
   adjusting a received signal parameter, such as sampling rate and phase angle, in order to eliminate the resultant phase error and compensate for carrier frequency offsets.

2. The method of claim 1 wherein a message signal portion of a transmitted signal is disposed between a synchronization signal pattern and the at least one known portion of the transmitted signal.

3. The method of claim 1 wherein the steps of determining a first and a second phase error further comprise the steps of:
   sampling the received signal to provide a first set of input signal samples;
   performing a complex correlation between the first set of input signal samples and a stored replica of a portion of the received signal;
   computing a transmission channel impulse response (CIR) based upon the correlation;
   determining a most significant CIR component by isolating the peak magnitude CIR value generated during the complex correlation;
   determining a product from a complex conjugate of the known portion of the transmitted signal and at least one input signal sample corresponding to the known portion of the transmitted signal; and
   removing the CIR component, thereby determining the phase error.

4. The method of claim 1 wherein the steps of determining a first and a second phase error further comprise the steps of:
   constructing a first replica signal which corresponds to the synchronization signal pattern portion of the transmitted signal, said second replica signal having no frequency error;
   comparing the first replica signal to the received signal to determine a first phase error;
   constructing a second replica signal which corresponds to the at least one known portion of the transmitted signal, said second replica signal having no frequency error; and
   comparing the second replica signal to the received signal to determine a second phase error.

5. The method of claim 1 further comprising the steps of:
   determining a first transmission channel impulse response (CIR) for the synchronization signal portion of the received signal;
   determining at least a second transmission channel impulse response (CIR) for the at least one known portion of the transmitted signal; and comparing the first CIR to the at least second CIR to determine a phase error.

6. The method of claim 1 wherein the step of adjusting a received signal parameter comprises at least one of the steps of:
   altering the received signal's sampling rate, as a function of the phase error; and
   phase rotating the message signal portion of the received signal, as a function of the phase error.

7. The method of claim 6 wherein a step of adjusting a received signal parameter is performed prior to message signal sequence estimation.

8. The method of claim 1 further comprising the step of averaging together a plurality of phase error estimates from a plurality of TDMA time slots.

9. The method of claim 1 wherein the at least one known portion of the transmitted signal comprises tail bits.

10. A method for providing carrier frequency offset compensation in a time division multiple access (TDMA) communication system comprising the steps of:
   receiving a transmitted signal, which includes a synchronization signal pattern, a known tail bit portion and a message signal portion, in a TDMA time slot, via a transmission channel;
   determining a first transmission channel impulse response (CIR) for the synchronization signal portion of the received signal;
   determining a second transmission channel impulse response (CIR) for the tail bit portion of the received signal;
   comparing the first CIR to the second CIR to determine a phase error; and
   adjusting a received signal parameter, such as sampling rate and phase angle, in order to eliminate the phase error and compensate for carrier frequency offsets.

11. The method of claim 10 wherein the received signal is demodulated from the synchronization signal pattern's center to the tail bit portions of the received signal.

12. The method of claim 10 wherein the steps of determining a first or a second CIR further comprise the steps of:
   sampling the received signal to provide a first set of input signal samples;
   performing a complex correlation between the first set of input signal samples and a stored replica of a portion of the received signal;
   computing a transmission channel impulse response (CIR) based upon the correlation; and
   determining a most significant CIR component by isolating the peak magnitude CIR value generated during the complex correlation.

13. The method of claim 10 wherein the step of adjusting a received signal parameter comprises at least one of the steps of:
   altering the received signal's sampling rate, as a function of the phase error; and
   phase rotating the message signal portion of the received signal, as a function of the phase error.

14. The method of claim 13 wherein the step of phase rotating the message signal portion o f the received signal further comprises the step of:
   modulating message signal samples, each by a differing amount, as a function of distance from the synchronization signal pattern center and the phase error estimated at the tail bit portions of a received signal.

15. The method of claim 13 wherein a step of adjusting a received signal parameter is performed prior to message signal sequence estimation.

16. An apparatus for providing carrier frequency offset compensation in a time division multiple access (TDMA) communication system comprising:
   means for receiving a transmitted signal, which includes a synchronization signal pattern, at least one known tail bit portion and a message signal portion, in a TDMA time slot, via a transmission channel;
   means, coupled to the receiving means, for determining a first phase error at the synchronization signal pattern portion of the received signal;
   means, coupled to the receiving means, for determining a second phase error at the at least one known tail bit portion of the received signal;
   means, coupled to the determining means for comparing the first and second phase errors to determine a phase angle difference; and
   means, coupled to the comparing means, for adjusting received signal parameters, such as sampling rate and phase angle in order to compensate for the phase angle difference prior to decoding the message signal portion of the received transmission.

17. The apparatus of claim 16 wherein the means for determining a first and a second phase error further comprises:
   means for sampling the received signal to provide a first set of input signal samples;
   complex correlation means, coupled to the sampling means, for performing a complex correlation between the first set of input signal samples and a stored replica of a portion of the received signal pattern;
   estimating means, coupled to the complex correlating means, for estimating a transmission channel impulse response (CIR) based upon the complex correlation;
   means, coupled to the estimating means, for determining a most significant CIR component, by isolating a peak magnitude CIR value, generated during the complex correlation;
   means, coupled to the determining means, for calculating a product from a complex conjugate of the known portion of the transmitted signal and at least one input signal sample corresponding to the known portion of the transmitted signal; and
   means, coupled to the calculating means, for removing the CIR component, and thereby determining a phase error.

18. The apparatus of claim 16 wherein the means for determining a first and a second error further comprise:
   means, for constructing a first replica signal which corresponds to the synchronization signal pattern of the transmitted signal, said second replica signal having no frequency error;
   means, coupled to the constructing means, for comparing the first replica signal to the received signal to determine a first phase error;
   means, for constructing a second replica signal which corresponds to the at least one known tail bit portion of the transmitted signal, said second replica signal having no frequency error; and
   means, coupled to the constructing means, for comparing the second replica signal to the received signal to determine a second phase error.

19. The apparatus of claim 16 wherein the means for adjusting received signal parameters comprises at least one of:
   a voltage controlled oscillator, coupled to the phase error determining means, for altering the received signal's sampling rate, as a function of the phase error; and
   a phase correcting circuit, coupled to the phase error determining means, for phase rotating the message signal portion of the received signal, as a function of the phase error.

20. The apparatus of claim 16 further comprising:
   means, for modulating message signal samples, each by a differing amount, as a function of the phase error estimated at those portions of the received signal which correspond to the known portions of the transmitted signal.

21. The apparatus of claim 16 further comprising means for averaging together a plurality of phase error estimates to determine an average phase error estimate.

22. An apparatus for providing carrier frequency offset compensation in a time division multiple access (TDMA) communication system comprising:
   a receiver for receiving a transmitted signal, which includes a synchronization signal pattern, a tail bit portion and a message signal portion, in a TDMA time slot, via a transmission channel;
   means, coupled to the receiver, for estimating a first and second channel impulse response at different locations within the TDMA timeslot;
   means, coupled to the estimating means, for comparing the first and second channel impulse responses to determine a phase error; and
   means, coupled to the comparing means, for adjusting received signal parameters, such as sampling rate and phase angle in order to compensate for the phase error.

23. The apparatus of claim 22 wherein the first channel impulse response is determined as a function of detection of the synchronization signal pattern and the second channel impulse response is determined as a function of detecting the tail bit portion of a TDMA timeslot.

24. An apparatus for providing carrier frequency offset compensation in a time division multiple access (TDMA) communication system comprising:
   a receiver for receiving a transmitted signal, which includes a synchronization signal pattern, a tail bit portion and a message signal portion, in a TDMA time slot, via a transmission channel;
   means, coupled to the receiver, for detecting a received synchronization signal pattern to determine a first channel impulse response for the TDMA timeslot;
   means, coupled to the receiver, for detecting a received tail bit portion to determine a second channel impulse response for the TDMA timeslot;
   means, coupled to the detecting means, for comparing the first and second channel impulse responses to determine a phase error; and
   means, coupled to the comparing means, for adjusting received signal parameters, such as sampling rate and phase angle in order to compensate for the phase error.

* * * * *

UNITED STATES PATENT AND TRADEMARK OFFICE
CERTIFICATE OF CORRECTION

PATENT NO. : 5,245,611

DATED : SEPTEMBER 14, 1993

INVENTOR(S) : FUYUN LING AND GERALD P. LABEDZ

It is certified that error appears in the above-identified patent and that said Letters Patent is hereby corrected as shown below:

```
In Column 12, line 54, insert -- phase --
after "second".
```

Signed and Sealed this

Twenty-sixth Day of July, 1994

*Attest:*

BRUCE LEHMAN

*Attesting Officer*     *Commissioner of Patents and Trademarks*